United States Patent [19]
Pietruska et al.

[11] Patent Number: 5,922,150
[45] Date of Patent: *Jul. 13, 1999

[54] METHOD OF HEAT TREATING A COBALT-BASE ALLOY

[75] Inventors: Norman Pietruska, Durham; S. Michael Kurpaska, Manchester, both of Conn.

[73] Assignee: United Technologies Corporation, Hartford, Conn.

[*] Notice: This patent is subject to a terminal disclaimer.

[21] Appl. No.: 08/991,842

[22] Filed: Dec. 16, 1997

Related U.S. Application Data

[60] Continuation of application No. 08/594,340, Jan. 30, 1996, Pat. No. 5,741,378, which is a division of application No. 08/279,989, Jul. 26, 1994, Pat. No. 5,549,767, which is a continuation of application No. 07/879,022, May 6, 1992, abandoned.

[51] Int. Cl.$^6$ .................................................... C22C 19/07
[52] U.S. Cl. .......................................... 148/674; 148/538
[58] Field of Search ..................... 148/538, 674, 148/512

[56] References Cited

U.S. PATENT DOCUMENTS

| | | | |
|---|---|---|---|
| 3,667,939 | 6/1972 | Hecht et al. . | |
| 3,802,934 | 4/1974 | Augustine et al. . | |
| 3,985,582 | 10/1976 | Bibring et al. . | |
| 4,003,765 | 1/1977 | Davidson . | |
| 4,008,844 | 2/1977 | Duvall et al. | 228/119 |
| 4,078,922 | 3/1978 | Magyar et al. | 75/171 |
| 4,116,724 | 9/1978 | Hirschfeld et al. . | |
| 4,152,181 | 5/1979 | Hirakis . | |
| 4,285,459 | 8/1981 | Baladjanian et al. | 228/119 |
| 4,381,944 | 5/1983 | Smith, Jr. et al. | 75/255 |
| 4,437,913 | 3/1984 | Fukui et al. | 148/408 |
| 4,668,265 | 5/1987 | Gaul et al. | 65/8 |
| 4,726,101 | 2/1988 | Draghi et al. | 29/156.8 |
| 4,789,412 | 12/1988 | Nakamura et al. | 148/408 |
| 4,830,934 | 5/1989 | Ferrigno et al. | 428/678 |
| 4,938,805 | 7/1990 | Haydon et al. . | |
| 5,086,968 | 2/1992 | Fawley et al. | 228/119 |
| 5,156,321 | 10/1992 | Liburdi et al. | 228/119 |
| 5,741,378 | 4/1998 | Pietruska et al. | 148/674 |

FOREIGN PATENT DOCUMENTS

| | | |
|---|---|---|
| 52-47515 | 4/1977 | Japan . |
| 9203241 | 3/1992 | WIPO . |

OTHER PUBLICATIONS

Abstract of Japanese Patent 4–235261 Aug. 1992.

*Primary Examiner*—Scott Kastler
*Attorney, Agent, or Firm*—John E. Boyd, Esq.; Whitman Breed Abbott & Morgan LLP

[57] ABSTRACT

An improved method is described for repairing Co-base superalloy gas turbine engine components by applying a mixture of base alloy powder and base alloy powder with a melting point depressant to the surface of the component and heating at 2250–2300° F. to diffuse the melting point depressant isothermally into the base alloy. A protective coating is then applied, during which a heating cycle which ages the base material is used. The resultant component has high temperature creep properties which are significantly better than achieved using the prior art process. The same temperature cycle is also useful in the initial heat treatment of Co-base superalloys, and can also be used for rejuvenation of components which have experienced extensive exposure to engine operating conditions.

29 Claims, 4 Drawing Sheets

METHOD OF HEAT TREATING A COBALT-BASE ALLOY

This application is a continuation of application Ser. No. 08/594,340, filed Jan. 30, 1996, which is a division of application Ser. No. 08/279,989, filed on Jul. 26, 1994 (now U.S. Pat. No. 5,549,767), which is a continuation of application Ser. No. 08/879,022, filed May 6, 1992 (now abandoned).

TECHNICAL FIELD

This invention relates to a process for repairing defects in cobalt-base superalloy gas turbine engine components caused by exposure to service conditions. The invention also relates to heat treating precipitation strengthened cobalt-base superalloys. The invention further relates to a process for rejuvenating precipitation strengthened cobalt-base superalloy articles.

Background Art

Cobalt-based superalloys are used for various components in gas turbine engines where the components are exposed to high temperatures and pressures for extended periods of time. A typical application is the high-pressure turbine vanes, where the temperature of the component can rise to about 2000° F. Under these conditions, the component is expected to retain its shape and strength long enough to provide economical operation of the engine without unduly frequent service or replacement requirements.

Typically, cobalt-base superalloy components have been produced by precision casting, which provides a near-net shape component requiring only minimal machining operations to reach final configuration. To provide additional protection for the material from the high temperatures and corrosive environment due to combustion processes, a protective coating is commonly applied. Components with adequate properties for the desired applications have been successfully produced with no heat treatment other than the heating cycle incurred as part of the coating process, which is effectively a precipitation heat treatment of the as-cast material.

After extended service, some of these components incur damage, due, e.g., to erosion, thermal mechanical fatigue-induced cracking caused by the frequent cycling between ambient and operating temperatures, or creep, which causes the airfoils to bow or the platforms to twist away from their original positions, with a resultant change in the operational characteristics of the vanes. A method of repair of this damage which has proved successful entails the use of a mixture of powders in which one of the powders melts at a temperature lower that the melting point of the damaged component and then isothermally solidifies by the diffusion of a melting point depressant into the material of the damaged component. See, for example, U.S. Pat. No. 4,008,844 issued to Paulonis, et al., and U.S. Pat. No. 4,726,101 issued to Draghi, et al., both of common assignee with the present invention, which are incorporated herein by reference. The temperature to which the component is exposed during the repair cycle is typically about 2050–2150° F.

SUMMARY OF THE INVENTION

It is accordingly an object of the present invention to provide a repair method for cobalt-base superalloy gas turbine engine components which provides improved mechanical properties compared to the prior art repair process, particularly the 1% creep life at engine operating temperatures.

It is another object to provide a method of adding material to the surface of a component which is worn or distorted to restore the component to its original dimensions.

It is a further object of the invention to provide a method for the heat treatment of cobalt-base superalloys which improves the mechanical properties.

Finally it is an object of the invention to provide a method for the rejuvenation of cobalt-base superalloy gas turbine engine components whose mechanical properties have been degraded by exposure to engine operating temperatures for extended periods of time.

According to the present invention, the repair process on gas turbine engine components involves cleaning in a hydrogen atmosphere at elevated temperature to remove oxides, applying a powder mixture which consists of a first powder having the same general composition as the component and a second powder having the same basic composition and containing in addition a melting point depressant, to the component, heating to a temperature at which the second powder melts, and holding at this temperature until the melting point depressant diffuses into the substrate and the melted powder solidifies. The powder is melted and isothermally diffused at 2250° F. to 2300° F. in vacuum or inert atmosphere, which is above the carbide solvus temperature for the alloy, for one to 12 hours, followed by a coating application and diffusion cycle, typically in an argon atmosphere, at 1965° F. for 24 hours or 1975° F. for four hours. The use of this procedure allows the filling of holes up to a diameter of about 0.050" and cracks up to about 0.040", which is significantly greater than in the prior art as evidenced in U.S. Pat. No. 4,830,934 to Ferrigno, et al.

The heat treatment involves heating at a temperature above the alloy's carbide solvus temperature for a period of one to 12 hours to dissolve the complex carbides. This typically is done in the temperature range of 2250–2300° F. A precipitation heat treatment is then performed at 1965° F. for about 24 hours or at 1975° F. for about four hours. This improves the 1% creep life of the material by approximately 700% at 1800° F. and by approximately 200% at 2000° F., compared to the as cast material with a 1965° F. or 1975° F. precipitation treatment.

Finally the process for rejuvenation of gas turbine engine components involves the same thermal cycles described above applied to components which have experienced extended periods of time in elevated temperature service, thus resulting in excessive precipitation of carbide compounds, but which have not suffered any damage which would require the above-described repair cycle.

The foregoing and other features and advantages of the present invention will become more apparent from the following description and accompanying drawings.

BEST MODE FOR CARRYING OUT THE INVENTION

Figure 1:
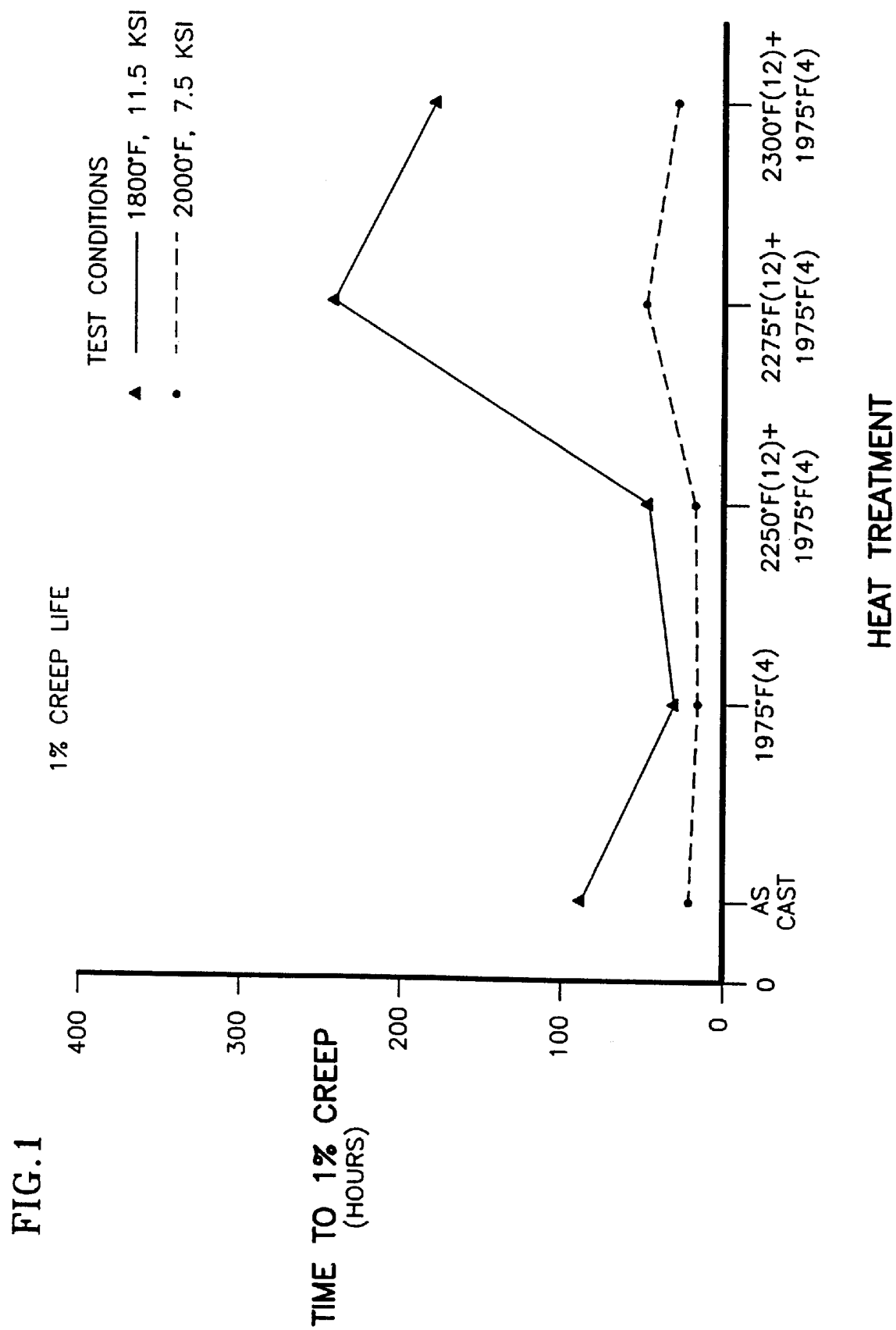
FIG. 1 is a graph showing the 1% creep life for MAR-M 509 for various processing conditions.

The use of cobalt-base superalloys for certain applications in a gas turbine engine is highly desirable because the material has good mechanical properties and a significant resistance to the corrosive environment inherently related to the combustion processes occurring in the engine. However, the operating conditions are sufficiently severe that the material requires additional protection, in the form of a protective coating, to provide the service lifetime required.

For an application such as a first-stage turbine vane in a gas turbine engine, the component is formed by investment casting, followed by a minimal amount of machining to bring critical dimensions within the required tolerances. The coating applied is typically of the MCrAlY type, where M is selected from the group consisting of iron, nickel, cobalt and certain mixtures thereof, or of the diffusion aluminide type. A typical application of the coating includes steps of applying the coating material to the surface of the component, either in the as-cast state or with a previously applied solution heat treatment, and heating for either four hours at about 1975° F. for the MCrAlY type coating, or for 24 hours at about 1965° F. for the diffusion aluminide type coating to diffuse the coating layer into the substrate material. This diffusion step acts effectively as a precipitation hardening step for the substrate cobalt-base material, in which $M_{23}C_6$ carbide compounds, where M is typically Cr, are formed and distributed around the eutectic phases located in the interdendritic regions.

The resultant components have mechanical properties, for example 1% creep life at 1800° F. and 11.5 ksi, based on a 4-hour heat treatment at 1975° F. of an as-cast sample, which are satisfactory for the applications intended. Similarly treated samples served as the baseline for comparison in all the testing for this invention.

After a significant service lifetime, these components frequently experience detrimental effects, typically in the form of erosion, thermal mechanical fatigue-induced cracking due to the temperature cycling encountered in normal operation of an engine, or creep due to the extended exposure time at elevated temperatures.

Processes have been developed to repair these worn components by adding material of essentially the composition of the cobalt-base alloy to rebuild the eroded areas of the component, or to fill in the cracks formed as discussed above. Prior to adding material, the component is cleaned, typically in a combination of vacuum and hydrogen atmosphere cycles, to remove oxides. It has been determined as a part of this work that a hydrogen treatment at 2150–2300° F. for one to four hours is sufficient to remove the oxides formed at the bottom of cracks formed in engine run components.

The material added is in the form of a powder mixture whose overall composition is similar to that of the component. As discussed above, a portion of this powder contains a melting point depressant so that this portion melts at a temperature below the melting point of the component material, but then solidifies as the melting point depressant diffuses into the component material.

The diffusion step of this prior art repair process is typically conducted at about 2100° F., and is effectively a carbide precipitation step at a higher temperature than the coating cycle of the original manufacturing process. The repair process is fully described in U.S. Pat. No. 4,008,844 as discussed above. The higher temperature heat treatment results in both a fine dispersion and acicular precipitation of $M_{23}C_6$ carbides around both the fine and coarse eutectic phases located in the interdendritic regions.

To provide suitably repaired components, it was desired to establish a repair procedure which would minimize carbide precipitation and provide creep properties better than those in the prior art repair process, while maintaining the other properties at levels which are at least as good as achieved in the prior art process.

Extensive experimental work using different powder compositions and powder melting and diffusion temperatures resulted in a processing sequence which provided both improved 1% creep life, and other mechanical properties which are either equivalent to or better than those attained using the prior art repair process.

It was determined that a repair process which included the use of a powder mixture containing 50–60% substrate alloy powder, and 40–50% low melting point powder having a composition, by weight, of approximately 19% Cr, 17% Ni, 8% Si, 4% W, 0.8% B, 0.4% C, balance Co (AMS 4783) at a temperature between about 2250° F. and 2300° F. for one to 12 hours in either vacuum or an inert atmosphere followed by cooling at 35° F./minute or greater provided a satisfactory means of filling in a crack or hole in the substrate material or adding material to an eroded surface.

The process of the present invention may be better understood through reference to the following illustrative examples.

EXAMPLE I

Test samples of MAR-M 509 cobalt-base alloy in the as-cast condition were heated for 12 hours at temperatures of 2250° F., 2275° F. and 2300° F. The composition of a MAR-M 509 cobalt-base alloy, in weight percent, is between about 0.54 and about 0.66 carbon, up to about 0.10 manganese, up to about 0.40 silicon, up to about 0.015 sulfur, between about 21.60 and about 26.40 chromium, between about 9.00 and about 11.00 nickel, between about 6.30 and about 7.70 tungsten, between about 3.15 and about 3.85 tantalum, between about 0.18 and about 0.22 titanium, between about 0.45 and about 0.55 zirconium, up to about 1.50 iron, up to about 0.01 boron, and remainder cobalt. The MAR-M 509 nominal composition contains, in weight percent, about 0.6 carbon, 24 chromium, 10 nickel, 7 tungsten, 3.5 tantalum, 0.2 titanium, 0.5 zirconium, and remainder cobalt. This was followed by a thermal cycle of four hours at 1975° F. to simulate the diffusion cycle for the thermal barrier coating.

The 1% creep life was determined at 1800° F. and 11.5 ksi, and at 2000° F. and 7.5 ksi. The results as shown in FIG. 1 show that the 1% creep life peaked in the samples prepared at 2275° F. in both cases, with an improvement at the lower test temperature of about 700%, and at the higher test temperature of about 200%, compared to the baseline condition of four hours at 1975° F. on as-cast material.

Figure 2:
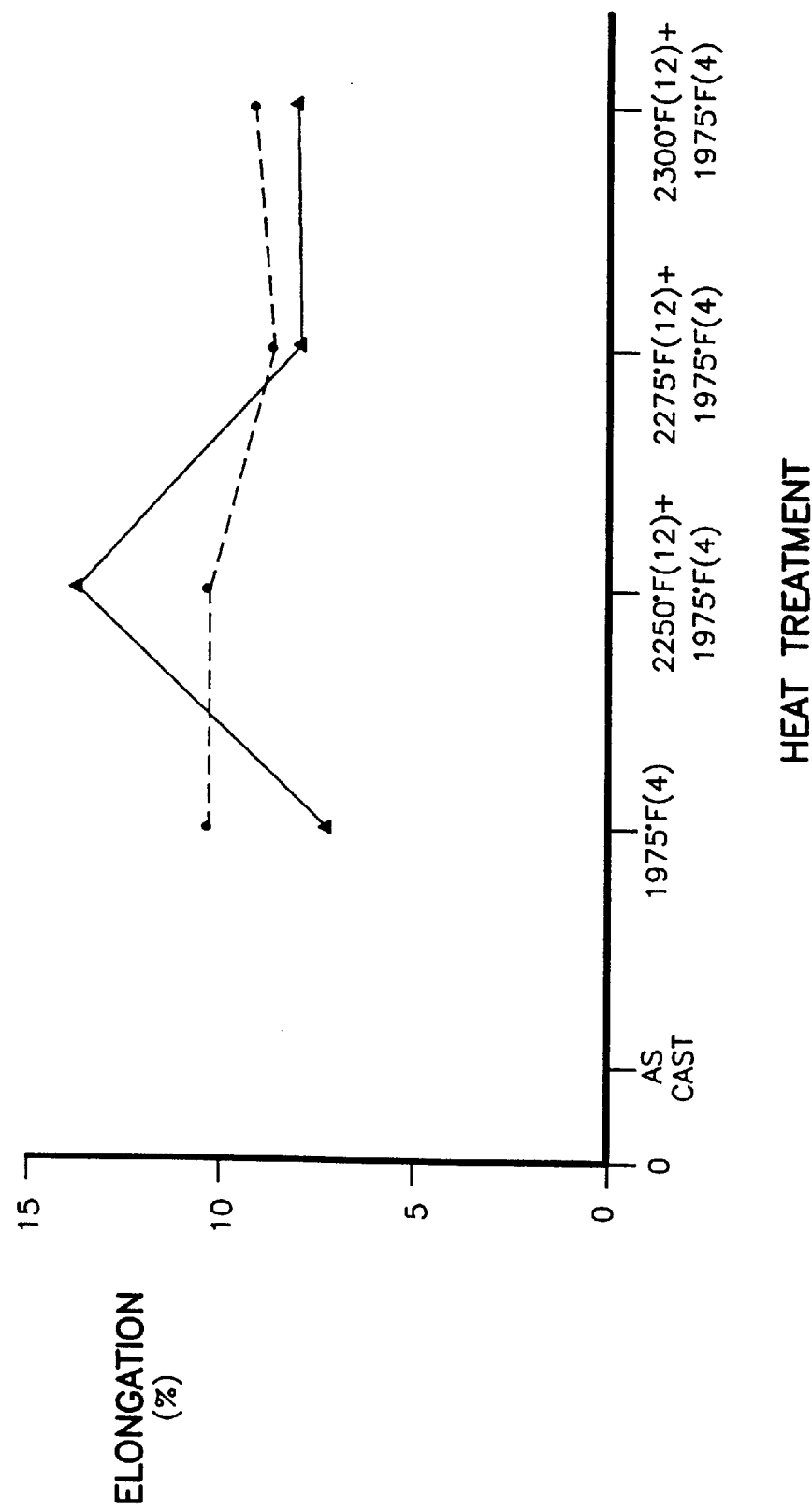
FIG. 2 is a graph showing the rupture elongation for MAR-M 509 for various processing conditions.

The rupture elongation for similarly prepared samples at the same test temperatures, as shown in FIG. 2 showed that this property remained at approximately the same level in the samples prepared using the invention processing as that of the baseline sample. A thermal cycle of eight hours at 2265° F. followed by a coating diffusion cycle of 1975° F. for four hours resulted in an improvement in the impact resistance of about 68% compared to the baseline sample.

EXAMPLE II

A portion of a MAR-M 509 gas turbine engine high pressure turbine vane containing cooling holes was prepared, using conventional chemical bath stripping methods, to remove the protective coating. Any remaining oxide scale was then removed by heating for four hours at about 2200° F. in a hydrogen atmosphere. A mixture of 50% by weight MAR-M 509 powder (44 micron diameter and finer) and 50% AMS 4783 powder (44 micron diameter and finer) was mixed with a binder based on ethyl cellulose, mineral oil and water to form a paste.

The paste was spread over the cooling holes of one half of the vane, and packed into the cooling holes of the other half of the vane. The cooling holes are generally slightly conical, with a maximum diameter of about 0.050". The sample was heated for 15 minutes in vacuum at 2265° F., cooled to allow placement of additional powder over the cooling holes as necessary, and heated for another five hours in vacuum at 2265° F.

Figure 3:
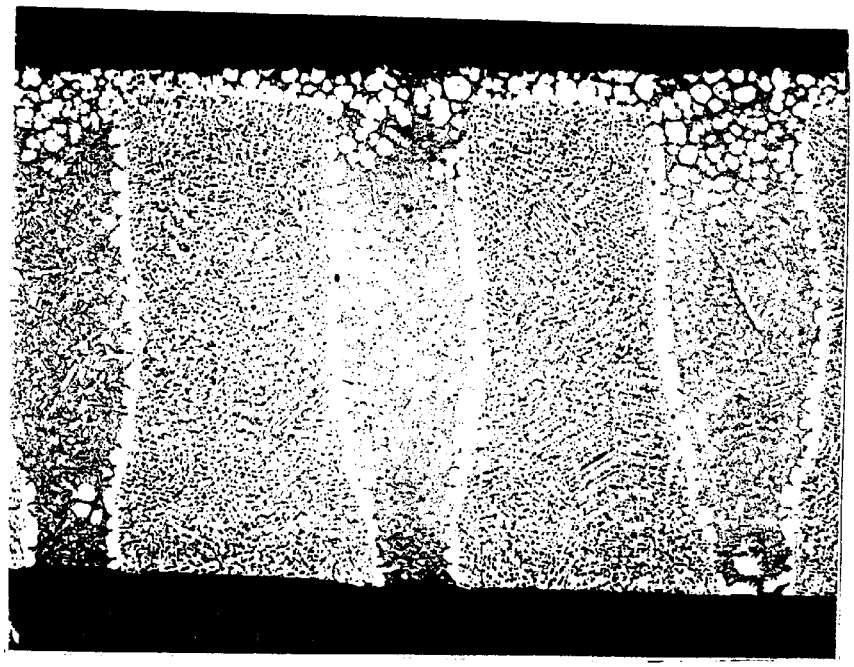
FIG. 3 is a 20X photomicrograph of the repaired cooling holes in a MAR-M 509 turbine vane with the repair powder placed over the holes in the vane.

The microstructure of the filler material where the powder was spread over the surface of the sample is shown in FIG. 3. The MAR-M 509 powder particles are not distributed evenly throughout the length of the hole, but are concentrated at the top of the hole, while the AMS 4783 particles, after melting, have formed a matrix which has flowed down into the hole without carrying a proportionate number of the MAR-M 509 particles along.

Figure 4:
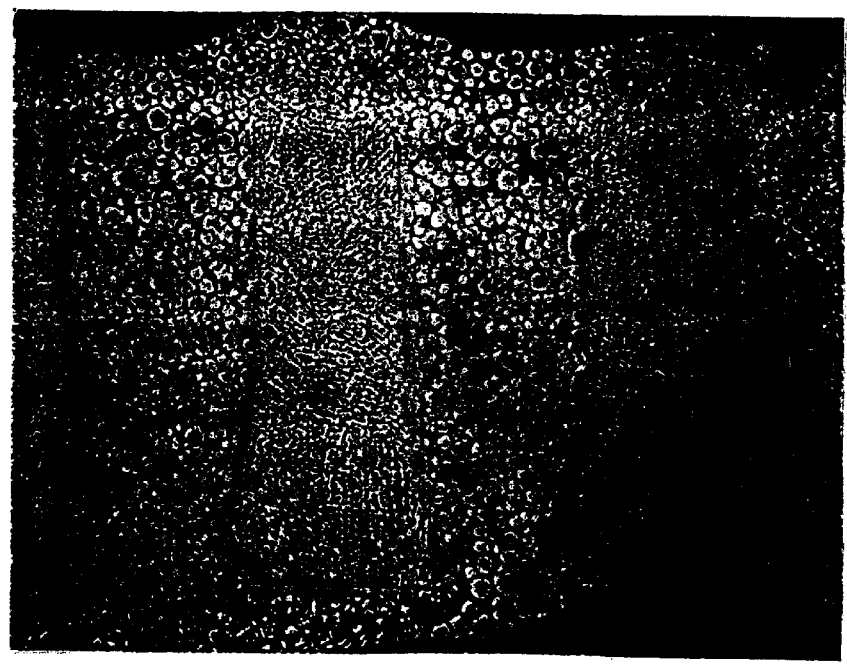
FIG. 4 is a 20X photomicrograph of the repaired cooling holes in a MAR-M 509 turbine vane with the repair powder packed into the holes prior to melting and isothermal diffusion.

In comparison, the microstructure of the filler material where the powder was packed into the cooling holes is shown in FIG. 4. Here the MAR-M 509 particles are uniformly distributed throughout the length of the holes, with the AMS 4783 matrix uniformly distributed between the particles.

EXAMPLE III

A portion of a MAR-M 509 turbine vane, having several through thickness cracks, was cleaned as described in Example II. Some of the same repair powder paste as used in Example II was placed over the cracks, and the sample was heated for 15 minutes in vacuum at 2265° F., cooled, and heated for another five hours in vacuum at 2265° F.

Figure 5:
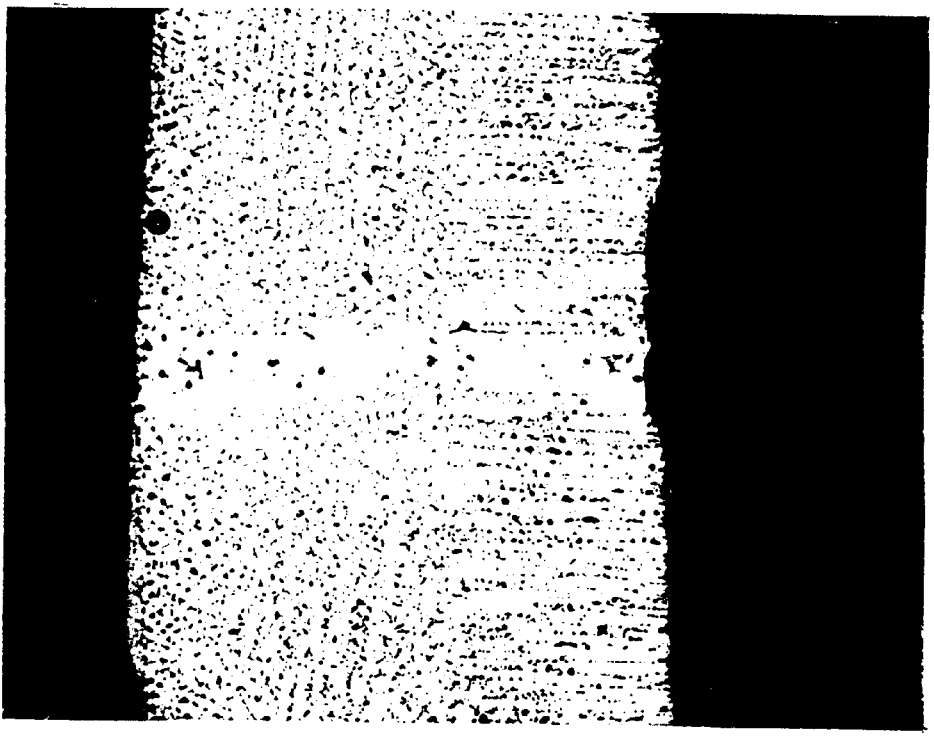
FIG. 5 is a 50X photomicrograph of a repaired crack in a MAR-M 509 turbine vane with the repair powder placed over the crack prior to melting and isothermal diffusion.

The cracks were successfully filled through the full thickness of the sample with a uniform dispersion of the repair powder, as shown in FIG. 5, for a crack having a width of about 0.008".

EXAMPLE IV

A portion of a MAR-M 509 turbine vane, having a blind crack (a crack not penetrating completely through the thickness of the material) was cleaned as described in Example II. Some of the same repair powder paste as used in Example II was placed over the crack, and the sample was heated for 15 minutes in vacuum at 2265° F., cooled, and heated for another five hours in vacuum at 2265° F.

Figure 6:
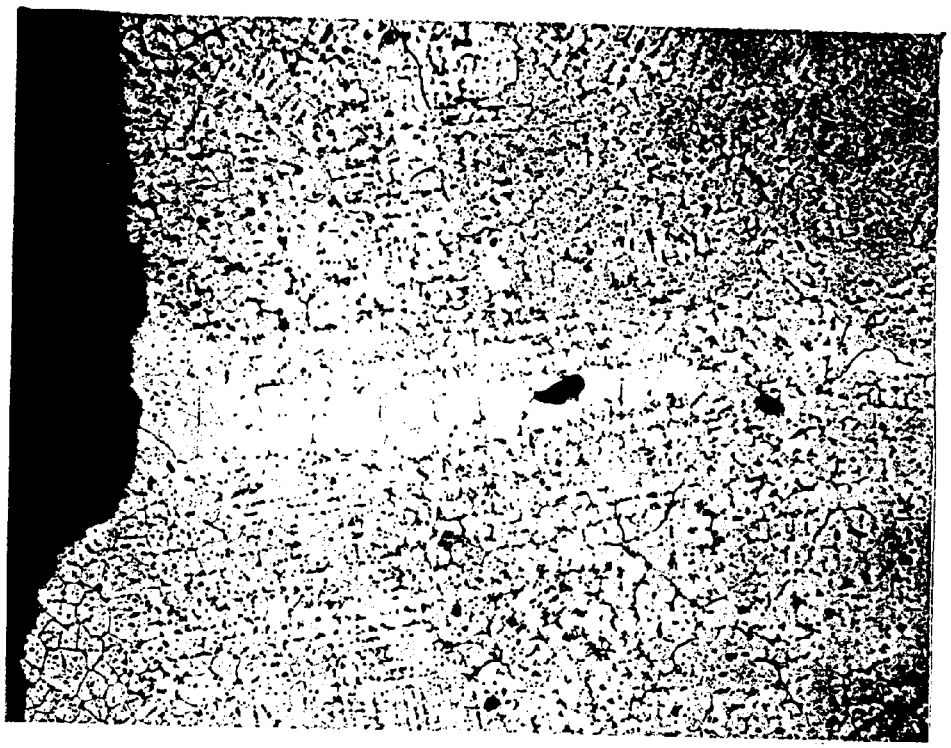
FIG. 6 is a 50X photomicrograph of a repaired blind crack in a MAR-M 509 turbine vane with the repair powder placed over the crack prior to melting and isothermal diffusion.

The crack was successfully filled to the crack tip with a uniform dispersion of the repair powder, as shown in FIG. 6.

EXAMPLE V

A 0.040" gap between two 0.125" thick MAR-M 509 plates was packed with the same powder mixture as in Example II. The sample was heated for 15 minutes in vacuum at 2265° F. with the gap oriented vertically, cooled to add any additional powder necessary, and heated for an additional five hours in vacuum at 2265° F.

This procedure successfully filled the gap, with the repair powder remaining in the gap, rather than running out when the low melting point powder melted. The microstructure is similar to that shown in FIG. 4.

Although this invention has been described using MAR-M 509 cobalt-base alloy and a filler material based on AMS 4783 brazing material, the concept presented is generally applicable to other precipitation hardenable cobalt-base alloys, such as WI-52 and MAR-M 302, and to other filler materials which are metallurgically compatible with the cobalt-base alloys.

It will be obvious to one skilled in the art that these procedures will also be found useful for rejuvenating, or restoring the mechanical properties, of components which have encountered extended periods of service at elevated temperatures, since these components are basically similar to those needing repair for damage incurred, and for adding material to the surface of components which have been eroded or distorted during service to restore them to their original dimensions.

It should be understood that the invention is not limited to the particular embodiments shown and described herein, but that various changes and modifications may be made without departing from the spirit and scope of this novel concept as defined by the following claims.

We claim:

1. A method of heat treating a MAR-M 509 cobalt-base alloy having complex carbides and a carbide solvus temperature, the method consisting essentially of the steps of:
   a. solution heat treating the MAR-M 509 cobalt-base alloy at a solution heat treat temperature above the carbide solvus temperature for one to twelve hours to dissolve the complex carbides, wherein the solution heat treat temperature is approximately 2250° F.–2300° F.; and
   b. aging at approximately 1975° F. for two to eight hours, whereby creep life is improved,
   wherein said MAR-M 509 cobalt-base alloy has a composition comprising carbon, chromium, nickel, tungsten, tantalum, titanium, zirconium, and remainder cobalt.

2. A method as recited in claim 1 wherein the MAR-M 509 cobalt-base alloy is cooled at a rate equal to or greater than 35° F./minute prior to aging.

3. A method of heat treating a MAR-M 509 cobalt-base alloy having complex carbides and a carbide solvus temperature, the method consisting essentially of the steps of:
   a. solution heat treating the MAR-M 509 cobalt-base alloy at a solution heat treat temperature above the carbide solvus temperature for one to twelve hours to dissolve the complex carbides, wherein the solution heat treat temperature is approximately 2250° F.–2300° F.; and
   b. aging at approximately 1965° F. for two to twenty-four hours, whereby creep life is improved,
   wherein said MAR-M 509 cobalt-base alloy has a composition comprising carbon, chromium, nickel, tungsten, tantalum, titanium, zirconium, and remainder cobalt.

4. A method of heat treating a MAR-M 509 cobalt-base alloy having complex carbides and a carbide solvus temperature, the method comprising the steps of:
   a. solution heat treating the MAR-M 509 cobalt-base alloy at a solution heat treat temperature above the carbide solvus temperature for one to twelve hours to dissolve the complex carbides, wherein the solution heat treat temperature is approximately 2250° F.–2300° F.; and b. aging at approximately 1975° F. for two to eight hours whereby creep life is improved, wherein said MAR-M 509 cobalt-base alloy has a composition comprising carbon, chromium, nickel, tungsten, tantalum, titanium, zirconium, and remainder cobalt.

5. A method of heat treating a MAR-M 509 cobalt-base alloy having complex carbides and a carbide solvus temperature, the method comprising the steps of:

a. solution heat treating the MAR-M 509 cobalt-base alloy at a solution heat treat temperature above the carbide solvus temperature for one to twelve hours to dissolve the complex carbides, wherein the solution heat treat temperature is approximately 2250° F.–2300° F.; and b. aging at approximately 1965° F. for two to twenty-four hours, whereby creep life is improved, wherein said MAR-M 509 cobalt-base alloy has a composition comprising carbon, chromium, nickel, tungsten, tantalum, titanium, zirconium, and remainder cobalt.

6. The method of claim 1, wherein said cobalt-base alloy has a composition, in weight percent, of between about 0.54 and about 0.66 carbon, up to about 0.10 manganese, up to about 0.40 silicon, up to about 0.15 sulfur, between about 21.60 and about 26.40 chromium, between about 9.00 and about 11.00 nickel, between about 6.30 and about 7.70 tungsten, between about 3.15 and about 3.85 tantalum, between about 0.18 and about 0.22 titanium, between about 0.45 and about 0.55 zirconium, up to about 1.50 iron, up to about 0.01 boron, and remainder cobalt.

7. The method of claim 3, wherein said cobalt-base alloy has a composition, in weight percent, of between about 0.54 and about 0.66 carbon, up to about 0.10 manganese, up to about 0.40 silicon, up to about 0.15 sulfur, between about 21.60 and about 26.40 chromium, between about 9.00 and about 11.00 nickel, between about 6.30 and about 7.70 tungsten, between about 3.15 and about 3.85 tantalum, between about 0.18 and about 0.22 titanium, between about 0.45 and about 0.55 zirconium, up to about 1.50 iron, up to about 0.01 boron, and remainder cobalt.

8. The method of claim 4, wherein said cobalt-base alloy has a composition, in weight percent, of between about 0.54 and about 0.66 carbon, up to about 0.10 manganese, up to about 0.40 silicon, up to about 0.15 sulfur, between about 21.60 and about 26.40 chromium, between about 9.00 and about 11.00 nickel, between about 6.30 and about 7.70 tungsten, between about 3.15 and about 3.85 tantalum, between about 0.18 and about 0.22 titanium, between about 0.45 and about 0.55 zirconium, up to about 1.50 iron, up to about 0.01 boron, and remainder cobalt.

9. The method of claim 5, wherein said cobalt-base alloy has a composition, in weight percent, of between about 0.54 and about 0.66 carbon, up to about 0.10 manganese, up to about 0.40 silicon, up to about 0.15 sulfur, between about 21.60 and about 26.40 chromium, between about 9.00 and about 11.00 nickel, between about 6.30 and about 7.70 tungsten, between about 3.15 and about 3.85 tantalum, between about 0.18 and about 0.22 titanium, between about 0.45 and about 0.55 zirconium, up to about 1.50 iron, up to about 0.01 boron, and remainder cobalt.

10. The method of claim 1, wherein the composition, in weight percent, comprises about 0.6 carbon, 24 chromium, 10 nickel, 7 tungsten, 3.5 tantalum, 0.2 titanium, 0.5 zirconium, remainder cobalt.

11. The method of claim 3, wherein the composition comprises about 0.6 carbon, 24 chromium, 10 nickel, 7 tungsten, 3.5 tantalum, 0.2 titanium, 0.5 zirconium, remainder cobalt.

12. The method of claim 4, wherein the composition comprises about 0.6 carbon, 24 chromium, 10 nickel, 7 tungsten, 3.5 tantalum, 0.2 titanium, 0.5 zirconium, remainder cobalt.

13. The method of claim 5, wherein the composition comprises about 0.6 carbon, 24 chromium, 10 nickel, 7 tungsten, 3.5 tantalum, 0.2 titanium, 0.5 zirconium, remainder cobalt.

14. The method of claim 1, wherein the aging is performed for about four hours.

15. The method of claim 3, wherein the aging is performed for about twenty-four hours.

16. The method of claim 1, wherein said solution heat treat temperature is about 2275° F.

17. The method of claim 3, wherein said solution heat treat temperature is about 2275° F.

18. The method of claim 1, wherein said heat treating improves 1% creep life of the alloy by at least 200%.

19. The method of claim 1, wherein said heat treating improves 1% creep life of the alloy by at least 700%.

20. The method of claim 1, wherein said MAR-M 509 cobalt-base alloy comprises defects and said method further comprises the step of applying a powder mixture to the alloy in the vicinity of the defect prior to said solution heat treating, wherein said powder mixture comprises a composition substantially the same as the MAR-M 509 cobalt-base alloy and a melting point depressant.

21. The method of claim 1, further comprising the step of cleaning the MAR-M 509 alloy to remove oxides prior to said solution heat treating.

22. The method of claim 3, wherein said heat treating improves 1% creep life of the alloy by at least 200%.

23. The method of claim 3, wherein said heat treating improves 1% creep life of the alloy by at least 700%.

24. The method of claim 3, wherein said MAR-M 509 cobalt-base alloy comprises defects and said method further comprises the step of applying a powder mixture to the alloy in the vicinity of the defect prior to said solution heat treating, wherein said powder mixture comprises a composition substantially the same as the MAR-M 509 cobalt-base alloy and a melting point depressant.

25. The method of claim 3, further comprising the step of cleaning the MAR-M 509 alloy to remove oxides prior to said solution heat treating.

26. The method of claim 1, wherein said step of aging directly follows said step of solution heat treating.

27. The method of claim 3, wherein said step of aging directly follows said step of solution heat treating.

28. The method of claim 4, wherein said step of aging directly follows said step of solution heat treating.

29. The method of claim 5, wherein said step of aging directly follows said step of solution heat treating.

* * * * *